US009682887B2

(12) United States Patent
Grussing et al.

(10) Patent No.: US 9,682,887 B2
(45) Date of Patent: Jun. 20, 2017

(54) COMPOSITIONS AND METHODS FOR REDUCING LIME BUCKING IN PLASTER PRODUCTS

(71) Applicant: United States Gypsum Company, Chicago, IL (US)

(72) Inventors: Jeffrey F. Grussing, Trevor, WI (US); Samar Emami, Chicago, IL (US); Trevor S. Rische, Trevor, WI (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 0 days.

(21) Appl. No.: 14/804,618

(22) Filed: Jul. 21, 2015

(65) Prior Publication Data
US 2016/0068434 A1    Mar. 10, 2016

Related U.S. Application Data

(60) Provisional application No. 62/048,631, filed on Sep. 10, 2014.

(51) Int. Cl.
*C04B 11/00* (2006.01)
*C04B 28/12* (2006.01)
*C04B 28/14* (2006.01)
*C04B 40/00* (2006.01)
*C04B 40/06* (2006.01)

(52) U.S. Cl.
CPC .............. *C04B 11/00* (2013.01); *C04B 28/12* (2013.01); *C04B 28/145* (2013.01); *C04B 40/0042* (2013.01); *C04B 40/0608* (2013.01)

(58) Field of Classification Search
CPC ....... C04B 11/00; C04B 28/12; C04B 28/145; C04B 40/0042; C04B 40/0608; C04B 14/06; C04B 22/064; C04B 22/066; C04B 22/148; C04B 22/143; C04B 24/2641; C04B 2103/12; C04B 2103/408; C04B 2103/0057
See application file for complete search history.

(56) References Cited

U.S. PATENT DOCUMENTS

| 1,996,372 | A | 4/1935 | Gardner |
| 2,216,555 | A | 10/1940 | King |
| 2,833,660 | A | 5/1958 | Busatti |
| 2,980,548 | A | 4/1961 | Lee Hampton |
| 4,184,887 | A | 1/1980 | Lange et al. |
| 4,237,260 | A | 12/1980 | Lange et al. |
| 5,472,500 | A | 12/1995 | Janicki |
| 6,790,276 | B1 | 9/2004 | Caval |
| 6,805,741 | B1 | 10/2004 | Liu et al. |
| 7,544,242 | B2 | 6/2009 | Liu et al. |
| 7,637,996 | B2 | 12/2009 | Blackburn et al. |
| 7,767,019 | B2 | 8/2010 | Liu et al. |
| 7,803,226 | B2 | 9/2010 | Wang et al. |
| 7,811,685 | B2 | 10/2010 | Wang et al. |
| 7,815,730 | B2 | 10/2010 | Wang et al. |
| 7,819,971 | B2 | 10/2010 | Stocco et al. |
| 8,088,218 | B2 | 1/2012 | Blackburn et al. |
| 8,093,326 | B2 * | 1/2012 | Mosquet ............. C04B 24/2647 523/344 |
| 2003/0100648 | A1 | 5/2003 | Yu et al. |
| 2004/0187741 | A1 | 9/2004 | Liu et al. |
| 2006/0278127 | A1 | 12/2006 | Liu et al. |
| 2008/0148997 | A1 | 6/2008 | Blackburn et al. |
| 2008/0171813 | A1 | 7/2008 | Sprouts et al. |
| 2008/0305252 | A1 | 12/2008 | Cimaglio et al. |
| 2011/0195378 | A1 * | 8/2011 | Wang ................... A61C 8/0012 433/167 |

FOREIGN PATENT DOCUMENTS

| BE | 816443 | 10/1974 |
| DE | 1269022 | 5/1968 |
| DE | 2437544 | 2/1976 |
| EP | 0774445 | 5/1997 |
| GB | 1 434 295 | * 5/1976 |

OTHER PUBLICATIONS

Penn et al, Epitaxial Assembly in Aged Colloids, J. Phys. Chem. B, vol. 105, No. 11, pp. 2177-2182, dated Feb. 22, 2001.
Penn et al, Morphology Development and crystal growth in nanocrystalline aggregates under hydrothermal conditions: Insights from titania, Geochimica et Cosmochimica Acta, vol. 63, No. 10, pp. 1549-1557, dated Jan. 18, 1999.
Patent Cooperation Treaty, PCT International Search Report from corresponding International Application PCT/US2015/047885, dated Jan. 5, 2016.
Patent Cooperation Treaty, PCT Written Opinion of the International Searching Authority from corresponding International Application PCT/US2015/047885, dated Jan. 5, 2016.

* cited by examiner

*Primary Examiner* — Anthony J Green
(74) *Attorney, Agent, or Firm* — Greer, Burns & Crain, Ltd.; Pradip Sahn; Philip T. Petti

(57) ABSTRACT

Methods of treating lime bucking in a plaster slurry are described. The method involves providing a slurry exhibiting lime bucking having a cone penetration of less than 10 mm at a consistency of 60 cc, comprising: water; calcium sulfate hemihydrate; and hydrated lime; and mixing an effective amount of a dispersant comprising a low intensity dispersant into the slurry so that the cone penetration increases and wherein the cone penetration is 10 mm or more at 10 minutes after addition of the dispersant at a consistency of 60 cc; and applying the plaster slurry containing the dispersant to a substrate. Veneer plaster dry component mixtures having reduced lime bucking when made into a slurry containing a low intensity dispersant, or hydrated lime coated with wax or a dibenzoate plasticizer are also described.

13 Claims, No Drawings

COMPOSITIONS AND METHODS FOR REDUCING LIME BUCKING IN PLASTER PRODUCTS

RELATED APPLICATIONS

This application claims priority to U.S. Provisional Patent Application No. 62/048,631 filed on Sep. 10, 2014, the entirety of which is incorporated herein by reference.

BACKGROUND

Several products are used in the building industry that utilize calcined gypsum, also known as stucco, plaster of Paris, or calcium sulfate hemihydrate. Calcined gypsum is the primary component of plaster. When water is added to calcined gypsum, it hydrates to form an interlocking matrix of calcium sulfate dihydrate, hardening to a solid mass.

Plaster is generally applied to a special substrate, such as lath, that holds the plaster in position as it sets and also is strong enough to hold the weight of the plaster applied to it. Plaster can also be applied as a veneer coating in a thin layer over wallboard. Special wallboard, known as "blue board," is recommended for use with veneer plaster.

Veneer plaster is a calcined gypsum plaster which is specially formulated to provide specific workability, strength, hardness and abrasion-resistance characteristics when applied in thin coats (1/16" nominal) over veneer gypsum base or other approved base.

Lime bucking, or simply bucking, is a condition associated with lime putty, veneer, and other plastering materials which is characterized by poor workability or stiffness well before normal setting. It is an early stiffening effect that takes place shortly after mixing the dry powdered product with water. When lime bucking occurs, the plaster mortar loses its ability to flow and becomes a highly viscous putty which often times is unusable as a trowelable material.

There is a need for methods of reversing lime bucking in plaster slurries. Furthermore, there is a need for plaster compositions which reduce or eliminate the occurrence of lime bucking when the plaster slurry is made.

SUMMARY

One aspect of the invention is a method of treating lime bucking in a plaster slurry. In one embodiment, the method involves providing a slurry exhibiting lime bucking having a cone penetration of less than 10 mm at a consistency of 60 cc, comprising: water; calcium sulfate hemihydrate; and hydrated lime; and mixing an effective amount of a dispersant comprising a low intensity dispersant into the slurry so that the cone penetration increases and wherein the cone penetration is 10 mm or more at 10 minutes after addition of the dispersant at a consistency of 60 cc; and applying the plaster slurry containing the dispersant to a substrate.

Another aspect of the invention is a veneer plaster dry component mixture having reduced lime bucking when made into a slurry. In one embodiment, the dry component mixture consists essentially of about 45 wt % to about 99 wt % calcium sulfate hemihydrate based on total weight of the dry component mixture; about 1 wt % to about 55 wt % hydrated lime based on total weight of the dry component mixture; and about 0.05 wt % to about 0.6 wt % dispersant based on the total weight of the dry component mixture, the dispersant consisting essentially of a low intensity polymethacrylate dispersant; 0 to about 3 wt % of at least one set control additive based on the total weight of the dry component mixture; and 0 to about 20 wt % of a filler based on the total weight of the dry component mixture.

Still another aspect of the invention is a veneer plaster dry component mixture having reduced lime bucking when made into a slurry. In one embodiment, the dry component mixture includes calcium sulfate hemihydrate; and hydrated lime; wherein the hydrated lime is coated with wax or a dibenzoate plasticizer.

DETAILED DESCRIPTION

The present invention meets this need by providing a method of reducing or eliminating lime bucking in a plaster slurry. The present invention further meets this need by providing dry plaster compositions which reduce or eliminate lime bucking when the plaster slurry is formed.

In one embodiment, the invention provides a chemical way to inhibit or prevent lime bucking through the use of a low intensity dispersant in the plaster mortar. The low intensity dispersant can be mixed into a plaster slurry exhibiting lime bucking on a job site. The low intensity dispersant reverses the lime bucking, allowing the plaster slurry to be used.

In other embodiments, the low intensity dispersant is mixed into the dry plaster composition. When the dry plaster composition is formed into a slurry, lime bucking does not occur or is reduced compared to a slurry made with the dry plaster composition without the low intensity dispersant.

In still other embodiments, the hydrated lime is treated with wax or dibenzoate plasticizer before being mixed into the dry plaster formulation. When the dry plaster composition is formed into a slurry, lime bucking does not occur or is reduced compared to a slurry made with the dry plaster composition without the wax or dibenzoate plasticizer.

Although not wishing to be bound by theory, one theory concerning lime bucking is that agglomeration of particles occurs during the drying of the hydrated lime. There are several forces which exist between the particles. During the last stages of drying, agglomeration would be driven by attractive capillary forces which eventually overcome the electrostatic repulsive forces. Attractive van der Waals forces will keep the particles attached once agglomeration occurs. When a colloidal dispersion undergoes agglomeration, it affects the rheology and properties of the slurry. It has been suggested that colloidal particles of calcium hydroxide may assemble by oriented attachment which would lead to oriented aggregation of the particles. Penn et al., Morphology development and crystal growth in nanocrystalline aggregates under hydrothermal conditions, Acta, 1999, 63, 1549; and Penn, et al., Epitaxial Assembly in Aged Colloids, J. Phys. Chem. B, 2001, 105, 2177. The bond is so strong that, in some cases, vigorous hand mixing and even mechanical mixing cannot break up the agglomerates. This leads to high viscosity because the water cannot get between the agglomerates.

High intensity dispersants or high range water reducers, such as polycarboxylates, and naphthalenes, have been used in plaster formulations. Many high range water reducers act as set retarders in plaster formulations. However, these high range water reducers cannot be used to address the lime bucking problem because they provide too much fluidity for veneer plaster, even when used in small amounts. The resulting veneer plaster mortar would be very loose and runny, and would drip down the wall.

However, it was discovered that a low intensity dispersant can be used to reduce and/or eliminate lime bucking in slurries exhibiting lime bucking. The low intensity dispersant does not provide excessive fluidity to the slurry, and it can be added in amounts that reduce or eliminate lime bucking. The low intensity dispersant can be a polymethacrylate compound with an anionic group(s). For example, it can be a sodium polymethacrylate compound with an anionic group, such as a sulfonate group. Examples of suitable low intensity dispersants include Daxad 30 and Daxad 30S available from Geo Specialty Chemicals of Cedartown, Ga.

The low intensity dispersant can be mixed into a slurry exhibiting lime bucking, rendering the slurry useable. Although not wishing to be bound by theory, by adding the low intensity dispersant, the reaction between the low intensity dispersant and the hydrated lime overcomes the strong bonds between the hydrated lime particles causing them to move freely against each other in the putty.

An accelerator, such as aluminum sulfate or calcium sulfate dihydrate, can be included with the low intensity dispersant to adjust the working properties of the plaster material to the proper set range, if necessary.

Alternatively, the low intensity dispersant can be included in the dry component mixture for the plaster in order to prevent lime bucking from occurring when the slurry is formed.

Although not wishing to be bound by theory, the low intensity dispersant is believed to function as an effective rheology modifier to decrease the viscosity and the effects of agglomeration as the hydrated lime particles undergo drying. The low intensity dispersant is believed to function through adsorption of the polymethacrylate backbone onto the surface of the suspended lime particles. The anionic group is oriented away from the particles and imparts a negative charge causing them to repel each other. Although not wishing to be bound by theory, it is believed that physical separation of the calcium hydroxide particles is obtained using the low intensity dispersant. The low intensity dispersant takes advantage of the surface charge of the hydrated lime to attach to the particles and keep them separated through repulsive forces. Uniform dispersion of the hydrophobic material is achieved through blending.

An effective amount of the low intensity dispersant can be added to a slurry exhibiting lime bucking or to the dry component mixture. The low intensity dispersant can be added in an amount of at least about 0.05 wt % based on total weight of solids in the slurry, or about 0.05 wt % to about 0.6 wt %, or about 0.1 wt % to about 0.6 wt %, or about 0.1 wt % to about 0.5 wt %, or about 0.2 wt % to about 0.5 wt %, or about 0.25 wt % to about 0.5 wt %, or about 0.3 wt % to about 0.5 wt %, or about 0.35 wt % to about 0.5 wt %. The low intensity dispersant can be added to the dry composition in an amount of at least about 0.05 wt % based on the total weight of the dry component mixture, or about 0.05 wt % to about 0.6 wt %, or about 0.1 wt % to about 0.6 wt %, or about 0.1 wt % to about 0.5 wt %, or about 0.2 wt % to about 0.5 wt %, or about 0.25 wt % to about 0.5 wt %, or about 0.3 wt % to about 0.5 wt %, or about 0.35 wt % to about 0.5 wt %. When the low intensity dispersant is added to the dry component mixture, it can be pre-mixed with the hydrated lime, and then the mixture of hydrated lime and low intensity dispersant can be mixed with the other components. Alternatively, the low intensity dispersant can be mixed with the hydrated lime and other components at the same time.

It was also discovered that lime bucking can be reduced or eliminated by treating the hydrated lime particles before they are blended into the dry powder mixture. A chemical barrier is formed between the plaster and the hydrated lime particles. In one embodiment, the barrier is achieved by coating the hydrated lime particles with a hydrophobic material such as a wax. The lime particles are heated to a temperature above the melting point of the wax. The wax liquefies and coats the hydrated lime particles, forming an impermeable coating when it cools. The wax can be present in an amount of about 0.1 wt % to about 4 wt % based on the weight of the hydrated lime, or about 0.5 wt % to about 4 wt %, or about 1 wt % to about 4 wt %, or about 1.5 wt % to about 4 wt %, or about 2 wt % to about 4 wt %, or about 0.5 wt % to about 3.5 wt %, or about 0.5 wt % to about 3 wt %, or about 0.5 wt % to about 2.5 wt %, or about 0.5 wt % to about 2 wt %. The coated hydrated lime can then be mixed into the plaster formulation. Although wax has been used as an additive in some plaster formulations, the wax was not heated and did not coat any plaster components.

Treating the hydrated lime particles with dibenzoate plasticizers has also been shown to reduce lime bucking. The dibenzoate plasticizer can be dry blended with the hydrated lime. The dibenzoate plasticizer can be present in an amount of at least about 0.5 wt % based on the weight of the hydrated lime, or about 0.5 wt % to about 10 wt %, or about 1 wt % to about 10 wt %, or about 1 wt % to about 8 wt %, or about 1 wt % to about 7 wt %, or about 1 wt % to about 6 wt %, or about 1 wt % to about 5 wt %, or about 1 wt % to about 4 wt %, or about 1 wt % to about 3 wt %. The coated hydrated lime can then be mixed into the plaster formulation.

The principal ingredient in the plaster system composition is the calcined gypsum, also known as stucco or calcium sulfate hemihydrate. Anhydrous calcium sulfate and synthetic stucco are also included in the term "calcined gypsum." This ingredient enables the composition to function as a setting-type compound, wherein it hydrates to form an interlocking matrix of calcium sulfate dihydrate crystals upon the addition of water. The beta-crystalline form of the calcium sulfate hemihydrate can be used as it is more readily available; however, other crystal forms of calcined gypsum could also be used. In general, at least about 40% by weight of the dry component composition is calcium sulfate hemihydrate, or at least about 45%, or at least about 50%, or at least about 60%, or at least about 70%, or at least about 80%. The calcium sulfate hemihydrate typically ranges up to about 90% by weight. Some embodiments of the plaster system utilize from about 70% to about 90% of the calcium sulfate hemihydrate.

Hydrated lime (which does not set with water) is added to the plaster system to improve workability. It provides water retention which gives the plaster slurry a slickness that is preferred by applicators, allowing the plaster system to glide onto the substrate smoothly and easily. The hydrated lime can be a hydrated dolomitic Type S lime. The hydrated lime is generally present in amounts less than about 60 wt % based on the total weight of solids in the slurry or the total weight of dry component mixture, or less than about 55 wt %, or less than about 50 wt %, or less than about 40 wt %, or less than about 30 wt %. Some embodiments of the plaster system utilize hydrated lime in amounts of about 1 wt % to about 20 wt %, or about 5 wt % to about 20 wt %, or about 7 wt % to about 20 wt %, or about 10 wt % to about 20 wt %, or about 12 wt % to about 20 wt %.

In addition, fillers, can also optionally be present. Suitable fillers include, but are not limited to, calcium carbonate, sand, perlite, vermiculite, clay, talc, mica, anhydrite, and the like. The amount of filler permitted depends on the filler used. For example, calcium carbonate is typically present in amounts up to about 20 wt % based on the total weight of solids in the slurry or the total weight of dry component mixture. Sand could be present in amounts up to three times the amount of dry components. Those of skill in the art can determine the appropriate amount of the particular filler. Fillers having an initial set with water, such as hydraulic lime, can be used in small amounts, such as less than about 5 wt % based on the total weight of solids in the slurry or the total weight of dry component mixture, or less than about 2 weight %, or less than about 1 wt %. However, fillers having an initial set with water are desirably not present.

Set control additives can be included in the composition. Set control additives include set retarders and set accelerators. Set retarders are typically added to the plaster system to increase the working time. Set accelerators are used to decrease the working time. Set accelerators are often used in combination with retarders to help stabilize the setting characteristics of the plaster product. Any set control additives useful in plasters or joint compounds could be used in the plaster system. The set control additives are typically present in an amount of about 0 wt % to about 3 wt % based on the total weight of solids in the slurry or the total weight of dry component mixture, or about 0 wt % to about 2 wt %, or about 0 wt % to about 1 wt %, or about 0 wt % to about 0.5 wt %, or about 0 wt % to about 0.3 wt %. The amount is based on the amount of the active ingredient in the set control additive.

The plaster systems may have a pH in the range of about 10-13.

Additional optional ingredients to the plaster system include preservatives, wetting agents, and defoamers. These ingredients, if present, are also used in minor amounts generally ranging from about 0.010 wt % to about 1 wt % of the total weight of the dry component mixture prior to adding water.

The dry component mixture is made into a plaster slurry at the job site. In this case, components are added in dry form. Many of the ingredients, including calcined gypsum, fillers, and hydrated lime, are readily available in dry forms. Some ingredients are available in both dry and wet forms. In such cases, the dry forms of components would typically be used to make the dry component mixtures.

The plaster system is typically applied over plaster blueboard. It can be applied to ordinary wallboard if a bonding agent is applied, followed by a veneer basecoat, and the finish plaster.

The plaster system can be applied using a hawk and trowel or a spray applicator, for example.

EXAMPLES

The severity of lime bucking was evaluated using a modified Vicat apparatus described in Section 8 of ASTM C-472 to measure the cone penetration at 10 min (unless otherwise indicated) after the start of mixing. The total weight of the rod and conical plunger was 35 g. If two or more measurements were taken at different times, the conical plunger was wiped clean, and a determination was made on a new area of the sample in the filled ring mold. The testing was performed at room temperature.

All of the formulations were mixed at a 60 cc consistency except Example 1. The samples were allowed to soak for 1 min and were mixed by hand for 90 sec. The severity of the lime bucking was rated on the following scale:

| Cone Penetration | Lime Bucking Severity |
| --- | --- |
| >25 mm | None |
| 20-25 mm | Trace |
| 15-20 mm | Slight |
| 10-15 mm | Moderate |
| 5-10 mm | Severe |
| <5 mm | Unusable |

Where the number is on the border between two ratings, both are used; for example, a penetration of 10 mm would be rated as moderate to severe.

Example 1

A slurry of 17.74 lb water and 31.54 lb of plaster (DIAMOND Veneer Finish (DVF) available from USG Corp.) was prepared. The determined consistency of the slurry was 56.25 cc. The consistency was determined by dividing the water weight by the dry powder weight on a percent basis.

The slurry exhibited severe lime bucking after several minutes. The slurry was unusable, and it could not even be poured out of the bucket.

An admixture was prepared by dry blending 61.85 g of low intensity dispersant (Daxad 30S) and 30.93 g of aluminum sulfate. The powdered admixture was added to the slurry exhibiting lime bucking. The sample was drill mixed for one min.

The sample was then used to plaster a wall. The plaster had typical application and working properties; no issues were encountered in using the plaster.

The drill mix Vicat Set was 87 min. The cone penetration/lime bucking at 32 min was 25 mm/None.

The presence of the low intensity dispersant negated the effects of lime bucking and allowed the slurry to be used by the plasterer.

Example 2

A low intensity dispersant (Daxad 30S) was dry blended into the DVF plaster formulation (Daxad 30S Added Directly to Plaster) at various levels prior to conditioning in a 75° F. (23.9° C.)/10% relative humidity (RH) room for 4 days and 14 days.

The low intensity dispersant was blended with hydrated lime first and conditioned in a 75° F. (23.9° C.)/10% RH room for 4 and 14 days prior to mixing with the remaining components for the DVF plaster formulation. After the DVF plaster formulation was made, the samples were evaluated (Daxad 30S Added Initially to Lime).

The samples were packaged in plain kraft paper bags for conditioning.

The severity of lime bucking was evaluated using a modified Vicat apparatus described in ASTM C-472 as described above to measure the cone penetration 10 minutes and 20 minutes after the start of mixing. The total weight of the rod and conical plunger was 35 g. If two or more measurements were taken at different times, the conical plunger was wiped clean, and a determination was made on a new area of the sample in the filled ring mold. All of the formulations were mixed at a 60 cc consistency. The samples were allowed to soak for 1 min and were mixed by hand for 90 sec. The severity of the lime bucking was rated as described above. The results are shown in Table 1.

TABLE 1

Evaluation of Daxad 30S Dispersant

| | Daxad 30S Added Directly to DVF Plaster | | | | Daxad 30S Added Initially to Lime | | | |
|---|---|---|---|---|---|---|---|---|
| | 1 | 2 | 3 | 4 | 5 | 6 | 7 | 8 |
| Amount Daxad Dispersant Based on Lime: | 0.00% | 0.50% | 1.00% | 2.00% | 0.00% | 0.50% | 1.00% | 2.00% |
| Stucco | 2700.0 | 2700.0 | 2700.0 | 2700.0 | 2700.0 | 2700.0 | 2700.0 | 2700.0 |
| Hydrated Dolomitic Type S Lime | 600.0 | 597.0 | 594.0 | 588.0 | 600.0 | 597.0 | 594.0 | 588.0 |
| Daxad 30S | 0.00 | 3.00 | 6.00 | 12.00 | 0.00 | 3.00 | 6.00 | 12.00 |
| Set Control Additives | 2.24 | 2.24 | 2.24 | 2.24 | 2.24 | 2.24 | 2.24 | 2.24 |
| | Initial Baseline Results - Lab | | | | | | | |
| Test Consistency | 60 cc | 60 cc | 60 cc | 60 cc | | | | |
| Cone Penetration @ 10 minutes | 31.5 mm | 33 mm | 34.5 mm | 35.5 mm | | | | |
| Lime Bucking Classification | None | None | None | None | | | | |
| Hand Mix Vicat Set | 2.03 hours | 2.32 hours | 2.70 hours | 3.77 hours | | | | |
| | 75° F./10% Conditioning Room | | | | | | | |
| Test Consistency | 60 cc | 60 cc | 60 cc | 60 cc | 60 cc | 60 cc | 60 cc | 60 cc |
| No. Days in Conditioning Room | 4 | 4 | 4 | 4 | 4 | 4 | 4 | 4 |
| Cone Penetration @ 10 minutes | 5.5 mm | 7 mm | 20.5 mm | 26.5 mm | 7 mm | 10 mm | 19 mm | 28.5 mm |
| Lime Bucking Classification | Severe | Severe | Trace | None | Severe | Severe | Slight | None |
| Hand Mix Vicat Set | 1.73 hours | 1.97 hours | 2.18 hours | 4.28 hours | 1.70 hours | 1.87 hours | 2.12 hours | 4.12 hours |
| | 75° F./10% Conditioning Room | | | | | | | |
| Test Consistency | 60 cc | 60 cc | 60 cc | 60 cc | 60 cc | 60 cc | 60 cc | 60 cc |
| No. Days in Conditioning Room | 14 | 14 | 14 | 14 | 14 | 14 | 14 | 14 |
| Cone Penetration @ 10 minutes | 5 mm | 10 mm | 22 mm | 26.5 mm | 5.5 mm | 7.5 mm | 18 mm | 27 mm |
| Cone Penetration @ 20 minutes | — | — | 11.5 mm | 26 mm | — | — | 10 mm | 26 mm |
| Lime Bucking Classification @ 10 minutes | Unusable | Severe | Moderate | None | Severe | Severe | Slight | None |
| Hand Mix Vicat Set | 1.70 hours | 1.85 hours | 2.12 hours | 4.38 hours | 1.70 hours | 1.88 hours | 2.12 hours | 3.95 hours |

These test results indicated that lime bucking was reduced as the concentration of the sodium polymethacrylate low intensity dispersant was increased. After 14 days of conditioning under harsh environmental conditions, it was shown that lime bucking was prevented in formulations containing at least 0.36% by weight of the low intensity dispersant.

Example 3

Veneer plaster formulations containing hydrated lime were prepared. A synthetic ethylene bis stearamide (EBS) (S-400-SP5 available from Shamrock Technologies, Inc.) was dry blended separately with the hydrated lime at various levels before being incorporated into the DVF plaster formulation. The hydrated lime and wax material was evaluated as an addition to the formulation. The hydrated lime and wax mixtures were also heat treated in a furnace held at a temperature 25° C. above the melt point of the wax before dry blending in the DVF plaster formulation. Control samples without wax were also evaluated.

In one example, the hydrated lime and synthetic wax was dry blended with the DVF plaster and set control additives without prior heat treatment in a furnace. In another example, the hydrated lime and synthetic wax was heat treated in a separate process step, and then dry blended with the plaster and set control additives.

Baseline results were obtained on freshly formulated samples. The samples were placed in a kraft paper bag and stored in a 75° F. (23.9° C.)/10% RH room for 1 week. After conditioning, the samples were re-tested. The results are shown in Table 2.

TABLE 2

Evaluation of Shamrock S-400-SP5 Synthetic Wax

| | 1 | 2 | 3 | 4 | 5 | 6 | 7 | 8 |
|---|---|---|---|---|---|---|---|---|
| | No Heat Treatment | | | | Heat Treated | | | |
| Stucco | 2700.0 | 2700.0 | 2700.0 | 2700 | 2700.0 | 2700.0 | 2700.0 | 2700.0 |
| Hydrated Dolomitic Type S Lime | 600.0 | 594.0 | 588.0 | 576.0 | 600.0 | 594.0 | 588.0 | 576.0 |
| Shamrock S-400-SP5 Wax | 0.00 | 6.00 | 12.00 | 24.00 | 0.00 | 6.00 | 12.00 | 24.00 |

TABLE 2-continued

Evaluation of Shamrock S-400-SP5 Synthetic Wax

| | 1 | 2 | 3 | 4 | 5 | 6 | 7 | 8 |
|---|---|---|---|---|---|---|---|---|
| | No Heat Treatment | | | | Heat Treated | | | |
| Set Control Additives | 2.24 | 2.24 | 2.24 | 2.24 | 2.24 | 2.24 | 2.24 | 2.24 |
| Melting Point of Shamrock S-400-SP5 | — | 145° C. | 145° C. | 145° C. | — | 145° C. | 145° C. | 145° C. |
| Heat Treatment Temperature | NA | NA | NA | NA | 170° C. | 170° C. | 170° C. | 170° C. |
| Initial Baseline Results - Lab | | | | | | | | |
| Test Consistency | 60 cc | 60 cc | 60 cc | 60 cc | 60 cc | 60 cc | 60 cc | 60 cc |
| Lime Bucking @ 10 minutes | No | No | No | No | No | No | No | No |
| Cone Penetration @ 10 minutes | 30.5 mm | 29 mm | 31 mm | 27 mm | 27 mm | 29 mm | 28 mm | 29.5 mm |
| Lime Bucking Classification | None | None | None | None | None | None | None | None |
| 75° F./10% Conditioning Room | | | | | | | | |
| Test Consistency | 60 cc | 60 cc | 60 cc | 60 cc | 60 cc | 60 cc | 60 cc | 60 cc |
| No. Days in Conditioning Room | 7 | 7 | 7 | 7 | 7 | 7 | 7 | 7 |
| Lime Bucking @ 10 minutes | Yes | Yes | Yes | Yes | Yes | Yes | Yes | No |
| Cone Penetration @ 10 minutes | 5.5 mm | 5.5 mm | 4.5 mm | 6.5 mm | 6 mm | 8 mm | 17 mm | 28 mm |
| Lime Bucking Classification | Severe | Severe | Unusable | Severe | Severe | Severe | Moderate | None |

The test results indicated that lime bucking was reduced as the concentration of the synthetic wax was increased. This occurred only with the heat treated samples of hydrated lime and synthetic wax. After 7 days of conditioning under harsh environmental conditions, it was shown that lime bucking was prevented in formulations containing at least 0.73% by weight of the heat treated synthetic wax and hydrated lime blend.

Example 4

Veneer plaster finish formulations containing hydrated lime using various grades of dibenzoate plasticizers were prepared. The liquid dibenzoate plasticizers were dry blended with the hydrated lime using a Waring blender at a usage level of 6% by weight of the lime before incorporating the blend into the plaster formulation.

Baseline results were obtained on the freshly formulated samples. The formulations were placed in a kraft paper bag and stored in a 75° F. (23.9° C.)/10% RH room for 12 days. After conditioning, the samples were re-tested. The severity of lime bucking was determined as described above. The results are shown in Table 3.

TABLE 3

Evaluation of Plasticizer Additives As Lime Bucking Inhibitors

| | 1 | 2 | 3 | 4 | 5 | 6 |
|---|---|---|---|---|---|---|
| Stucco | 2700.0 | 2700.0 | 2700.0 | 2700 | 2700.0 | 2700.0 |
| Hydrated Dolomitic Type S Lime | 564.0 | 564.0 | 564.0 | 564.0 | 564.0 | 564.0 |
| Benzoflex 50 | 36.00 | | | | | |
| K-Flex 500 | | 36.00 | | | | |
| K-Flex 850S | | | 36.00 | | | |
| K-Flex 975S | | | | 36.00 | | |
| K-Flex DE | | | | | 36.00 | |
| K-Flex DP | | | | | | 36.00 |
| Set Control Additives | 2.24 | 2.24 | 2.24 | 2.24 | 2.24 | 2.24 |
| Initial Baseline Results - Lab | | | | | | |
| Test Consistency | 60 cc | 60 cc | 60 cc | 60 cc | 60 cc | 60 cc |
| Lime Bucking @ 10 minutes | No | No | No | No | No | No |
| Cone Penetration @ 10 minutes | 31 mm | 32 mm | 33 mm | 34 mm | 33 mm | 30 mm |
| Lime Bucking Classification | None | None | None | None | None | None |
| 75° F./10% Conditioning Room | | | | | | |
| Test Consistency | 60 cc | 60 cc | 60 cc | 60c cc | 60 cc | 60 cc |
| No. Days in Conditioning Room | 12 | 12 | 12 | 12 | 12 | 12 |
| Lime Bucking @ 10 minutes | Yes | Yes | Yes | Yes | Yes | Yes |
| Cone Penetration @ 10 minutes | 13 mm | 13 mm | 14.5 mm | 13.5 mm | 13 mm | 12.5 mm |
| Lime Bucking Classification | Moderate | Moderate | Moderate | Moderate | Moderate | Moderate |

These test results indicated that lime bucking was reduced with the addition of the dibenzoate plasticizers. After 12 days of conditioning under harsh environmental conditions, it was shown that lime bucking was reduced in formulations to a moderate level of severity. None of the formulations exhibited severe or unusable lime bucking severity.

Example 5

A DVF slurry was prepared which exhibited severe lime bucking. The slurry was prepared and tested at different consistencies typically used for plaster slurries to evaluate the effect of consistency on lime bucking. The results are shown in Table 4. The slurry consistency has little effect on lime bucking.

TABLE 4

Evaluation of Cone Penetrometer Test for Lime Bucking at Various Test Consistencies

| | DIAMOND Veneer Finish | | | |
|---|---|---|---|---|
| Test Consistency Cone Penetration: | @ 50 cc | @ 55 cc | @ 60 cc | @ 70 cc |
| - Measured at 10 minutes - | 4.5 mm | 4 mm | 4 mm | 7.5 mm |
| - Measured at 20 minutes - | 4 mm | 3.5 mm | 4.5 mm | 7 mm |
| Classification of Lime Bucking | Unusable | Unusable | Unusable | Severe |

By "about" we mean within 10% of the value, or within 5%, or within 1%.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A veneer plaster dry component mixture having reduced lime bucking when made into a slurry, the dry component mixture consisting essentially of:
   about 45 wt % to about 99 wt % beta-calcium sulfate hemihydrate based on total weight of the dry component mixture;
   about 1 wt % to about 55 wt % hydrated lime based on the total weight of the dry component mixture;
   about 0.05 wt % to about 0.6 wt % dispersant based on the total weight of the dry component mixture, the dispersant consisting essentially of a low intensity polymethacrylate dispersant;
   0 to about 3 wt % of at least one set control additive based on the total weight of the dry component mixture; and
   0 to about 20 wt % filler based on the total weight of the dry component mixture.

2. The dry component mixture of claim 1 wherein the polymethacrylate dispersant has an anionic group attached to the polymethacrylate backbone.

3. The dry component mixture of claim 1 wherein the polymethacrylate dispersant is a sodium polymethacrylate dispersant.

4. The dry component dry component mixture of claim 1 wherein there is at least about 60 wt % of the beta-calcium sulfate hemihydrate based on the total weight of the dry component mixture, and less than about 40 wt % of the hydrated lime based on the total weight of dry component mixture.

5. The dry component mixture of claim 1 wherein the dispersant is present in an amount of about 0.1 wt % to about 0.36 wt % based on the total weight of the dry component mixture.

6. The dry component mixture of claim 1 wherein there is:
   about 80 wt % to about 99 wt % beta-calcium sulfate hemihydrate based on total weight of the dry component mixture;
   about 1 wt % to about 20 wt % hydrated lime based on the total weight of the dry component mixture;
   about 0.05 wt % to about 0.5 wt % of a dispersant based on the total weight of the dry component mixture, the dispersant consisting essentially of a low intensity polymethacrylate dispersant; and
   0 to about 0.1 wt % of the at least one set control additive based on the total weight of the dry component mixture; and
   0 to about 20 wt % filler based on the total weight of the dry component mixture.

7. The dry component mixture of claim 1 the hydrated lime is a dolomitic hydrated Type S lime.

8. A veneer plaster dry component mixture having reduced lime bucking when made into a slurry, the dry component mixture comprising:
   calcium sulfate hemihydrate; and
   hydrated lime; and
   wherein the hydrated lime is coated with a wax or a dibenzoate plasticizer.

9. The mixture of claim 8 wherein there is at least about 60 wt % of the calcium sulfate hemihydrates based on total weight of the dry component mixture.

10. The mixture of claim 8 wherein there is less than about 40 wt % of the hydrated lime based on total weight of the dry component mixture.

11. The mixture of claim 8 wherein the hydrated lime is coated with the wax and wherein the wax is present in an amount of about 0.1 to about 4 wt % based on total weight of the hydrated lime.

12. The mixture of claim 11 wherein the hydrated lime is coated with the wax by heating the wax above a melting point of the wax and cooling the wax coated hydrated lime below the melting point.

13. The mixture of claim 8 wherein the hydrated lime is coated with the dibenzoate plasticizer, and wherein the dibenzoate plasticizer is present in an amount of at least about 0.5 to about 10 wt % based on total weight of the hydrated lime.

* * * * *

UNITED STATES PATENT AND TRADEMARK OFFICE
CERTIFICATE OF CORRECTION

PATENT NO. : 9,682,887 B2  
APPLICATION NO. : 14/804618  
DATED : June 20, 2017  
INVENTOR(S) : Jeffrey F. Grussing et al.

Page 1 of 1

It is certified that error appears in the above-identified patent and that said Letters Patent is hereby corrected as shown below:

On the Title Page

Under Item (74) Attorney, Agent, or Firm:  
Correct spelling of "Pradip Sahn"  
To:  
"Pradip Sahu"

Signed and Sealed this  
Twenty-eighth Day of November, 2017

Joseph Matal  
*Performing the Functions and Duties of the*  
*Under Secretary of Commerce for Intellectual Property and*  
*Director of the United States Patent and Trademark Office*